US012319122B2

(12) United States Patent
Flynn et al.

(10) Patent No.: US 12,319,122 B2
(45) Date of Patent: Jun. 3, 2025

(54) SENSOR CAP FOR CHARGE PORT

(71) Applicant: Hanon Systems, Daejeon (KR)

(72) Inventors: Patty Flynn, El Paso, TX (US); Eric Kesler, Northville, MI (US); Daniel Ratkos, Ferndale, MI (US)

(73) Assignee: HANON SYSTEMS, Daejeon (KR)

( * ) Notice: Subject to any disclaimer, the term of this patent is extended or adjusted under 35 U.S.C. 154(b) by 96 days.

(21) Appl. No.: 18/501,320

(22) Filed: Nov. 3, 2023

(65) Prior Publication Data
US 2024/0166018 A1 May 23, 2024

Related U.S. Application Data

(60) Provisional application No. 63/384,802, filed on Nov. 23, 2022.

(51) Int. Cl.
B60H 1/00 (2006.01)

(52) U.S. Cl.
CPC .............................. B60H 1/00792 (2013.01)

(58) Field of Classification Search
CPC . B60H 1/00485; B60H 1/00792; F25B 45/00; F25B 2345/006; F25B 2500/18; G01L 2019/0053
See application file for complete search history.

(56) References Cited

U.S. PATENT DOCUMENTS

| | | | | |
|---|---|---|---|---|
| 5,139,049 A | * | 8/1992 | Jensen | F16L 37/36 137/614.05 |
| 6,266,971 B1 | * | 7/2001 | Schroder | B60H 1/00585 62/77 |
| 2004/0182455 A1 | * | 9/2004 | Wells | F16K 11/207 137/594 |
| 2004/0262560 A1 | * | 12/2004 | Trumbower | F25B 45/00 251/284 |
| 2007/0205387 A1 | * | 9/2007 | Grau | F16K 5/0414 251/309 |
| 2012/0060953 A1 | * | 3/2012 | Trent | F25B 45/00 29/428 |
| 2012/0180888 A1 | * | 7/2012 | Trent | F16K 11/205 29/428 |

FOREIGN PATENT DOCUMENTS

| | | |
|---|---|---|
| CN | 214893861 U | 11/2021 |
| EP | 2090818 B1 | 5/2013 |
| KR | 100369129 B1 | 1/2003 |
| KR | 101512803 B1 | 4/2015 |
| WO | 9826203 A2 | 6/1998 |

* cited by examiner

Primary Examiner — Marc E Norman
(74) Attorney, Agent, or Firm — Shumaker, Loop & Kendrick, LLP; Dames D. Miller

(57) ABSTRACT

A sensor cap configured for removable coupling to a charge port includes a body having a flow path including a sensor chamber formed therein. A surface of the body is configured to engage a valve body of a valve assembly disposed within an opening of the charge port during axial insertion of a first portion of the body into the opening to cause the valve body to disengage from a valve seat of the valve assembly and adjust the valve assembly from a closed position to an open position providing fluid communication between a flow space disposed axially beyond the valve assembly and the flow path of the body. A sensing device disposed in the sensor chamber is fluidly coupled to the flow space by way of the flow path when the valve assembly is adjusted to the open position thereof.

20 Claims, 6 Drawing Sheets

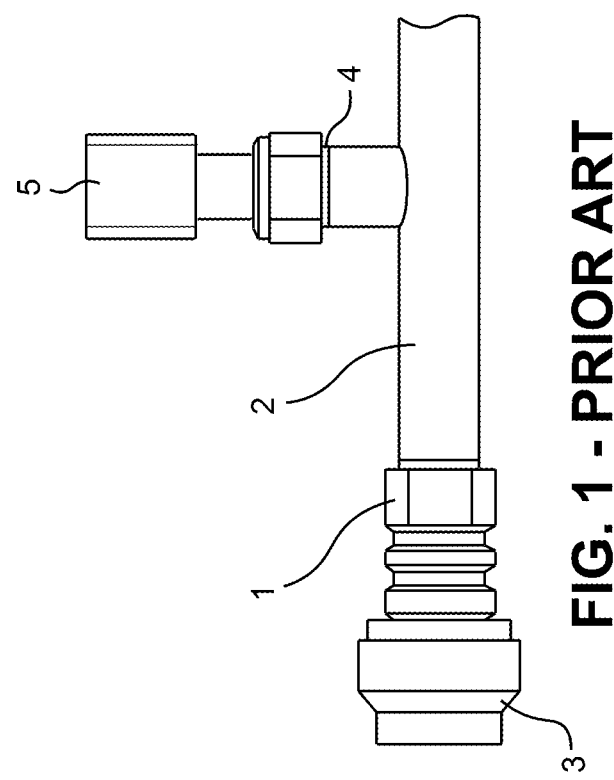
FIG. 1 - PRIOR ART

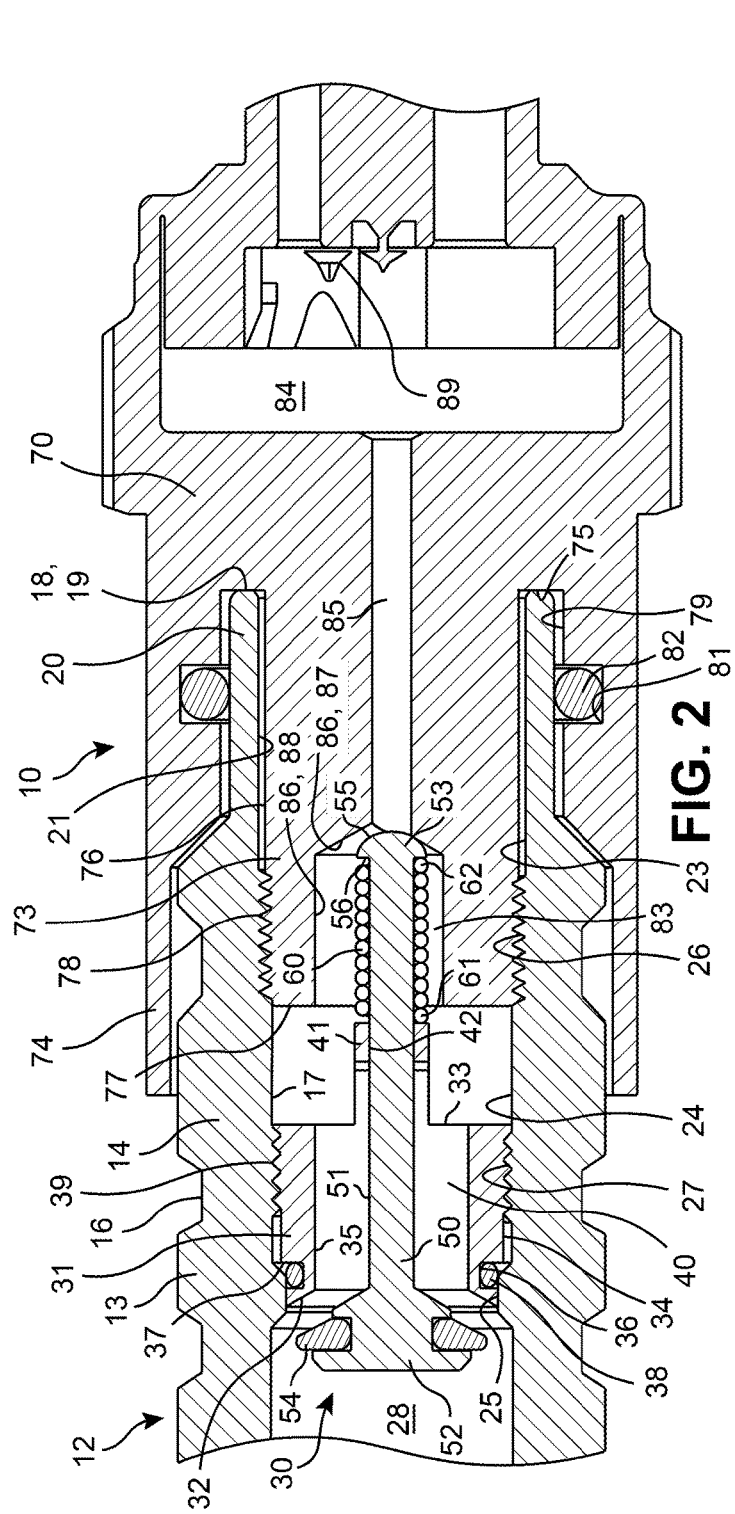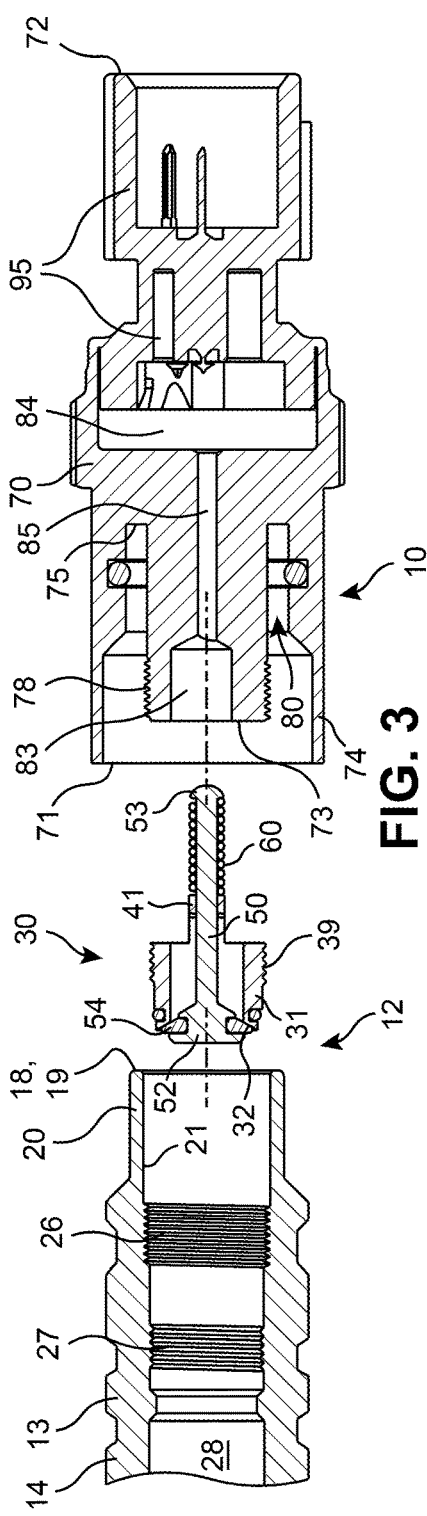

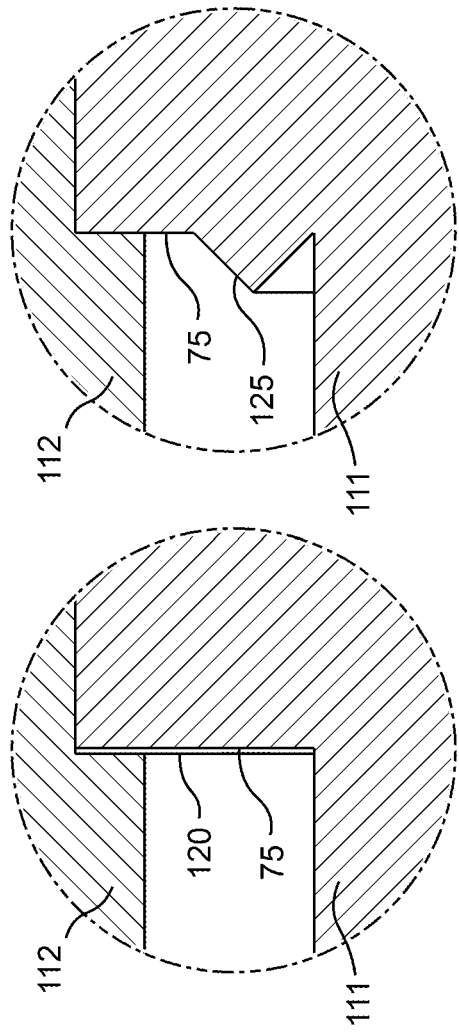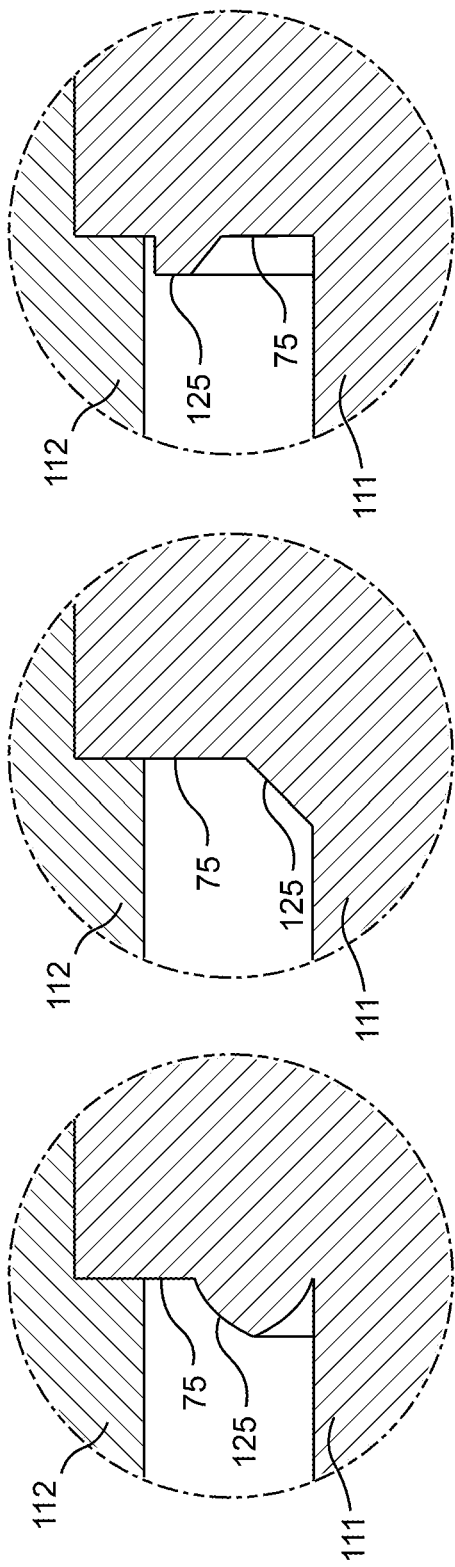

SENSOR CAP FOR CHARGE PORT

CROSS-REFERENCE TO RELATED APPLICATION

This patent application claims priority to U.S. Provisional Patent Application Ser. No. 63/384,802, filed on Nov. 23, 2022, the entire disclosure of which is hereby incorporated herein by reference.

TECHNICAL FIELD

The present disclosure relates to a sensor cap, and more particularly, to a sensor cap for a charge port of a refrigeration system.

BACKGROUND ART

In the automotive industry, the trend is moving from a refrigeration system with distributed components to "Integrated Refrigerant Modules" (IRM) and Heat Pump (HP) systems. Package space in a vehicle is thus becoming increasingly valuable. Any developments to make the module more compact are valuable improvements.

A charge port for a refrigeration system is provided in the refrigeration system to charge or fill the refrigeration system as necessary. When not in use to charge the refrigeration system, a cap is provided on the charge port to protect the charge port from damage, dirt, and other impurities.

Sensors are also provided in the refrigeration system to monitor and transmit pressure, temperature, flow rate, quality, intermolecular chromatography, and any other physical characteristics of a fluid at various points within the refrigeration system. The sensors also require a port or entry point into the refrigeration system in order to accurately read the pressure, temperature, flow rate, quality, intermolecular chromatography, and any other physical characteristics of the fluid.

As shown in FIG. 1, a refrigeration system according to the prior art may utilize a charge port 1 disposed at an end of a fluid line 2 of the refrigeration system utilized to convey a refrigerant therethrough, wherein the charge port 1 is configured for coupling to an exterior fluid system for delivering the refrigerant to the refrigeration system via the charge port 1. The fluid line 2 may be in fluid communication with a refrigerant circuit of the refrigeration system at any desired position therealong, including the fluid line 2 communicating with another fluid line extending between the adjacent components of the refrigerant circuit, or integrating an opposing end of the fluid line 2 directly into one of the components of the refrigerant circuit. The charge port 1 includes a removable sealing cap 3 disposed thereover for sealing the fluid line 2 at the charge port 1 when the charge port 1 is not being utilized for charging the refrigeration system via introduction of refrigerant thereat. A sensor port 4 is provided at a position on the fluid line 2 spaced apart from the charge port 1 and the corresponding sealing cap 3. The sensor port 4 includes a sensor cap 5 that closes off the sensor port 4 while also providing the necessary components for sensing and measuring any of the sensed properties of the refrigerant along the fluid line 2, which may further correspond to the sensing of the properties of the refrigerant along the refrigerant circuit at the position of intersection of the fluid line 2 therewith.

Unfortunately, the configuration disclosed in FIG. 1 undesirably utilizes a large amount of packaging space within the refrigeration system via the introduction of two coupling structures at along the end portion of the fluid line 2 in the form of the charge port 1 and the sensor port 4. This concern is further exacerbated by the manner in which the disclosed configuration utilizes perpendicular arranged axial directions of the charge port 1 and the sensor port 4 relative to the fluid line 2, which results in a profile of the fluid line 2 being increased in multiple different dimensions at two different spaced apart positions therealong. The disclosed configuration accordingly presents concerns when attempting to position and orient the fluid line 2 relative to the remainder of the refrigeration system while incorporating the charge port 1 and the sensor port 4 into the available packaging space. This may be especially evident where the disclosed configuration is incorporated into what is described above as an IRM, as it is more difficult to maintain a compactness of the module where multiple transversely arranged fluid coupling extend from the module.

It is also common for such refrigeration systems to utilize two independent charge ports 1 at different positions along the corresponding refrigerant circuit, such as positioning one charge port 1 to communicate the refrigerant to a high-pressure side of the refrigerant circuit disposed downstream of a compressor and upstream of an expansion device thereof and another charge port 1 to communicate the refrigerant to a low-pressure side of the refrigerant circuit disposed downstream of the expansion device and upstream of the compressor, wherein each of the charge ports 1 is further associated with one of the sensor ports 4 for measuring the differing properties of the refrigerant between the high-pressure and the low-pressure sides of the refrigerant circuit. Such a configuration utilizing two of the charge port 1 and sensor port 4 installations along the refrigerant circuit accordingly further exacerbates the above described packaging concerns by doubling the incidence of multiple coupling structures being positioned along the refrigerant circuit for attaining desired operation and maintenance thereof.

In addition to the described packaging concerns, the use of two distinct couplings where the refrigerant is introduced to the refrigeration system also undesirably increases the complexity and cost of the manufacturing process utilized in producing the disclosed segment of the fluid line 2 when accommodating the contrary structures and orientations of the charge port 1 and the sensor port 4 therein. The use of an additional port also introduces another position at which fluid leakage may occur while further adding unnecessary weight to the resulting refrigeration system.

It would accordingly be desirable to provide a refrigeration system wherein an efficiency is optimized and a package space is minimized via the incorporation of the combined functions of the charge port and the sensor into a common mechanism having a reduced packaging space and simplified method of manufacturing thereof.

SUMMARY

A refrigeration system according to the present disclosure wherein an efficiency is optimized and a package space is minimized by incorporation of a sensor port and cap structure into a charge port structure has surprisingly been discovered.

According to an embodiment of the present invention, a sensor cap configured for removable coupling to a charge port including a stem defining an opening and a valve assembly disposed within the opening of the stem is disclosed. The sensor cap comprises a body having a flow path formed therein with the flow path including a sensor chamber having a sensing device disposed therein. A surface of the body is configured to engage a valve body of the valve assembly during axial insertion of a first portion of the body into the opening of the stem to cause the valve body to disengage from a valve seat of the valve assembly. The disengagement of the valve body from the valve seat adjusts the valve assembly from a closed position to an open position providing fluid communication between a flow space formed within the opening of the stem to a first axial side of the valve assembly and the flow path of the body disposed to an opposing second axial side of the valve assembly. The sensing device disposed in the sensor chamber is fluidly coupled to the flow space by way of the flow path when the valve assembly is adjusted to the open position thereof, thereby allowing the sensing device to sense a property of a fluid originating from the flow space.

In another embodiment, a sensor body and cap assembly includes a support structure for sensor electronics for sensing pressure, temperature, pressure and temperature, flow rate, quality, intermolecular chromatography, and any other physical characteristics of a fluid within the system that may be monitored.

In another embodiment, a protective sealing cap for a charge port covers a ball lock groove on a mating charge valve stem and seals to the mating charge valve stem either by rubber (elastomeric) sealing by radial O-ring, axial gasket, or any combination thereof, by metal sealing via contact between a metal portion of the sensor body and the charge valve stem via application of a soft metal plating such as tin or other suitable material, a metallic insert consisting of a suitable metal (brass, babbit, aluminum, or other suitable material) with a thin tin plate to generate a metal seal between the insert and a charge port pilot end.

In another embodiment, a conduit is provided between system fluid properties, such as temperature and pressure, and sensor device electronics act as an included internal flow passage for transmittance of the system fluid properties which can be measured or sensed by the sensor device and electronics, a flow passage is intentionally offset to affect leakage between a sensor body and a head of a mating charge port charge valve pin so that the system fluid properties can be monitored, wherein an offset of the flow passage is between 0.001 mm and 2.0 mm, and wherein a geometry of the flow passage ensures system properties can be monitored by creating a leakage through the offset.

DESCRIPTION OF DRAWINGS

The above, as well as other objects, features, and advantages of the present disclosure will be understood from the detailed description of the preferred embodiments of the present disclosure with reference to the accompanying drawings, in which:

FIG. 1 is a side elevational view of a fluid line charge port and sensor port configuration according to the prior art;

FIG. 2 is a fragmentary elevational cross-sectional view through a central plane of an assembly of a charge port and a sensor cap according to an embodiment of the present invention, wherein the sensor cap includes a first flow configuration therethrough;

FIG. 3 is an exploded elevational cross-sectional view of the charge port and sensor cap of FIG. 2 prior to assembly thereof;

FIGS. 7-11 are various enlarged fragmentary views of different structural configurations of a base surface of the inner body of FIG. 6 that may be utilized in effecting a seal with the charge port or an intervening sealing element.

DESCRIPTION OF AN EMBODIMENT

Figure 4:
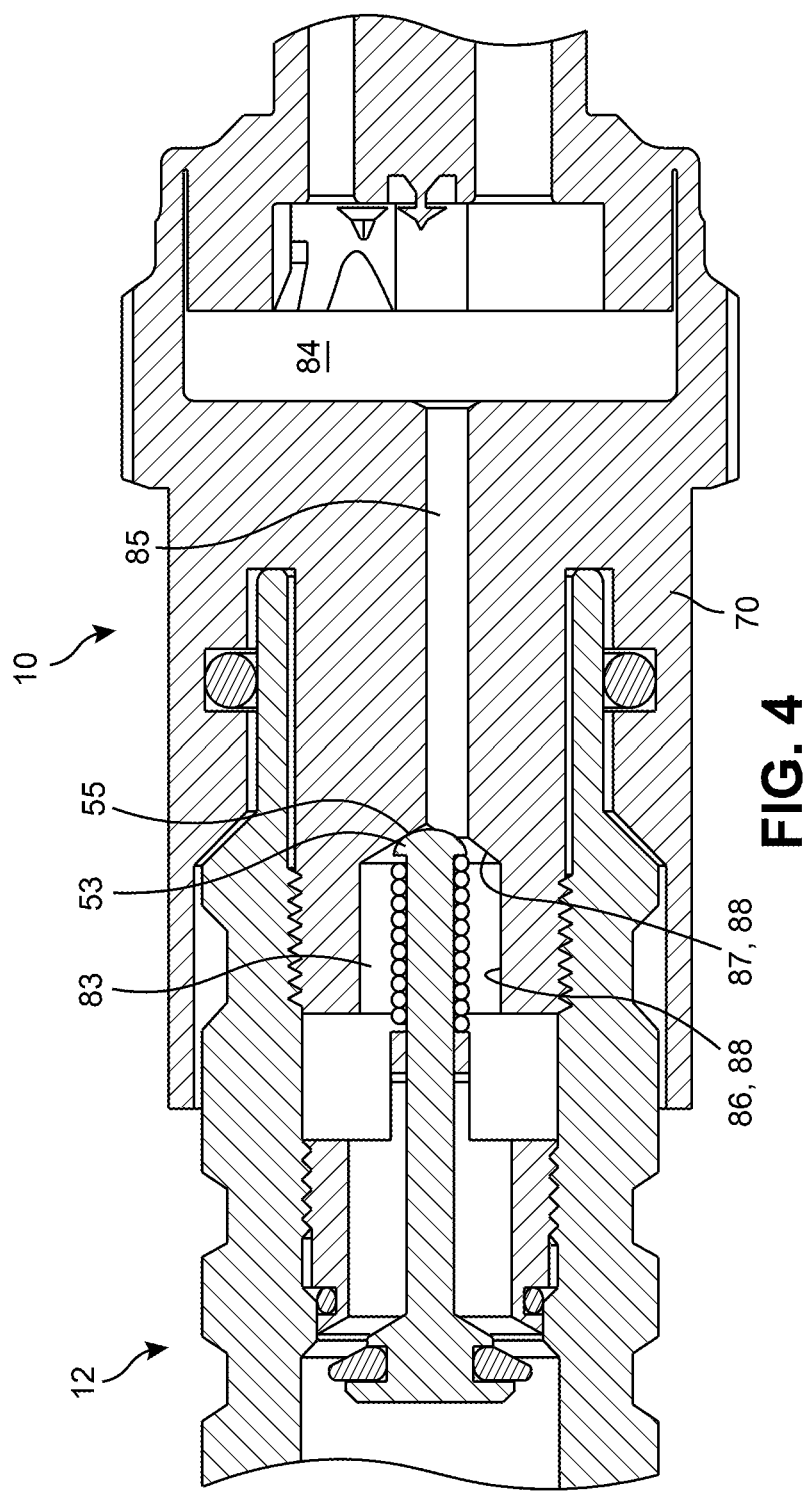
FIG. 4 is a fragmentary elevational cross-sectional view through the central plane of an assembly of a charge port and a sensor cap according to another embodiment of the present invention and having a second flow configuration therethrough.

The following description of technology is merely exemplary in nature of the subject matter, manufacture and use of one or more embodiments, and is not intended to limit the scope, application, or uses of any specific embodiment claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The invention is to combine any sensor sensing pressure, temperature, pressure and temperature, flow rate, quality, intermolecular chromatography, and other physical characteristics of a fluid into a cap which is disposed on an existing charge port for a refrigeration system (a refrigerant access valve). The combined sensor cap for the charge port eliminates a standalone sensor (which also requires a switch port) and a charge port cap by integration of the sensor and cap into a new multipurpose device.

FIGS. 2 and 3 disclose a sensor cap 10 configured for removable coupling to a charge port 12 according to an embodiment of the present invention. As explained hereinafter, the use of the sensor cap 10 for covering the charge port 12 eliminates the need for the use of an independently provided sensor port 4 and sensor cap 5 for sensing the properties of a refrigerant along a corresponding refrigerant circuit with respect to the position the corresponding fluid line 2 intersects the refrigerant circuit, with reference to the configuration of the prior art shown in FIG. 1. Additionally, the sealing cap 3 of the prior art is also not needed to selectively cover the charge port 12 when not being utilized to communicate refrigerant from a refrigerant source to the position the corresponding fluid line 2 intersects the refrigerant circuit, such as when charging the refrigerant circuit. The disclosed sensor cap 10 accordingly eliminates the use of a secondary port along the fluid line 2 of the prior art, and instead results in the use of only a single fluid coupling structure for forming a combined refrigerant supply source and sensing device with respect to a desired position along the corresponding refrigerant circuit.

The charge port 12 may be in fluid communication with any desired position along the corresponding refrigerant circuit while remaining within the scope of the present invention. In some circumstances, the refrigerant system may include two or more of the charge ports 12 disposed at different positions therealong for communicating the refrigerant to or from the refrigerant circuit and/or for sensing the properties of the refrigerant with respect to each of the different positions. For example, the refrigerant circuit may include a first one of the charge ports 12 in fluid communication with a high-pressure side of the refrigerant circuit disposed downstream of the compressor and upstream of the expansion device thereof and a second one of the charge ports 12 in fluid communication with a low-pressure side of the refrigerant circuit disposed downstream of the expansion device and upstream of the compressor thereof. Each of the charge ports 12 utilized in the fluid system may include a corresponding sensor cap 10 disposed thereover in the manner described herein.

The charge port 12 as shown may be disposed at the end of a tubular fluid line 2, such as shown in FIG. 1 with respect to the prior art (in the absence of the sensor port 4 and cap 5), that extends from the corresponding refrigerant circuit, or may be integrated directly into the structure of any component of the refrigerant circuit, such as being integrated into an inlet or outlet structure associated with a heat exchanger or other component along the refrigerant circuit. It should be readily apparent to one skilled in the art that the charge port 12 and sensor cap 10 as shown and described herein will maintain the same structure and method of operation regardless of the manner in which the charge port 12 is integrated into the corresponding refrigerant circuit, or the position at which the charge port 12 is placed in fluid communication with the flow path formed by the refrigerant circuit.

Although a charge port for a refrigeration system is described herein, it is understood the combined sensor cap 10 as shown and described herein can be used in other fluid systems such as in MAC, HVAC, PTC, petroleum fuel, hydrogen fuel cell, batteries, steering, hydraulics, and brake applications, as non-limiting examples. It is further understood that there may be multiple charge ports of the associated system, each of which is associated with one of the disclosed sensor caps 10, wherein each of the sensor caps 10 of the associated system may be responsible for detecting/measuring any of a variety of characteristics of the corresponding fluid, such as the pressure, temperature, flow rate, fluid quality, intermolecular chromatography, and/or other physical characteristics.

As shown in FIGS. 2 and 3, the charge port 12 includes a stem 13 having a valve assembly 30 disposed therein. As explained hereinafter, the valve assembly 30 is configured to be normally urged towards a closed position when the sensor cap 10 is removed from the charge port 12 and prior to engagement with a corresponding charging mechanism associated with introducing a fluid (refrigerant) to a corresponding fluid system (refrigerant system) via the charge port 12. The valve assembly 30 is further configured to be repositioned from the closed position to an open position, against the urging of the valve assembly 30, upon appropriate engagement with a corresponding fitting of a charging mechanism (not shown) configured to deliver the refrigerant to the charge port 12. A coupling of the sensor cap 10 of the present invention to the charge port 12 is similarly configured to reposition the valve assembly 30 from the normally closed position to an open position, thereby providing a fluid pathway for the corresponding fluid (refrigerant) to be sensed by a sensing device 15 associated with the disclosed sensor cap 10.

The stem 13 of the charge port 12 is formed by a substantially cylindrical circumferential wall 14 having an outer circumferential surface 16, an inner circumferential surface 17, and an axial end surface 18 connecting the circumferential surfaces 16, 17 at a distal axial end 19 of the circumferential wall 14. A thickness of the circumferential wall 14, as measured in a radial direction thereof between the inner and outer circumferential surfaces 16, 17, may be reduced towards the distal axial end 19 to form a piloting feature 20 of the charge port 12 for guiding axial insertion and engagement between the charge port 12 and the sensor cap 10. The stem 13 may be formed by substantially any rigid material, including a metallic material.

The inner circumferential surface 17 of the wall 14 defines a substantially cylindrical opening 21 along a central axis of the stem 13. As shown in FIG. 2, the inner circumferential surface 17 may be divisible to include a first cylindrical segment 23 extending axially inwardly from the distal axial end 19, a second cylindrical segment 24 extending axially inwardly from an axially inner end of the first cylindrical segment 23, and a radially inwardly extending and annularly shaped stop projection 25 disposed at an axially inner end of the second cylindrical segment 24. The first cylindrical segment 23 includes a first inner diameter, the second cylindrical segment 24 includes a second inner diameter that is smaller than the first inner diameter, and a radially innermost surface of the stop projection 25 includes a third inner diameter that is smaller than the second inner diameter. The first cylindrical segment 23 includes a first inner threaded portion 26 disposed therealong and the second cylindrical segment 24 includes a second inner threaded portion 27 disposed therealong. A flow space 28 is formed within the opening 21 at a position beyond the stop projection 25 and represents a portion of the opening 21 that is always fluidly coupled to the associated fluid system (refrigerant circuit) such that an opening of the valve assembly 30 allows for axial flow through the charge port 12 by way of the flow space 28. The flow space 28 is accordingly traversed by the fluid both when a charging process is occurring where the fluid is being communicated to the fluid system (refrigerant circuit) and during a sensing process where the fluid must be communicated to the sensor cap 10 for detecting and measuring the desired properties of the fluid.

The valve assembly 30 includes a core structure 31, a valve body 50 moveable relative to the core structure 31 for opening and closing flow of a fluid (refrigerant) through the valve assembly 30, and a spring element 60 axially urging the valve body 50 towards a closed position of the valve assembly 30 wherein the valve body 50 is sealingly engaging the core structure 31 to prevent flow therebetween. The valve body 50 includes a central shaft 51 extending axially from a poppet 52 disposed at an axially inner end thereof to a cap engaging structure 53 disposed at an axially outer end thereof. The poppet 52 extends radially outwardly from the central shaft 51 and includes an annular sealing structure 54 disposed along a radial outer region thereof that is configured to selectively sealingly engage the core structure 31 when the valve assembly 30 is adjusted to the closed position by the urging of the spring element 60.

The core structure 31 is substantially cylindrical in shape and includes a first axial end surface 32, an opposing second axial end surface 33, an outer circumferential surface 34, and an oppositely arranged inner circumferential surface 35. The first axial end surface 32 is configured to face in a direction of axial insertion of the core structure 31 into the opening 21 of the stem 13 and may form a valve seating surface of the valve assembly 30 for engaging the sealing structure 54 of the valve body 50 formed around the poppet thereof 52. The outer circumferential surface 34 may include an annularly shaped and radially inwardly extending indentation or groove 36 formed therein as well as a shoulder 37 disposed at an axial end of the indentation or groove 36 towards the second axial end surface 33. The indentation or groove 36 is configured to receive an annular sealing element 38, such as an O-ring, therein to establish an annular seal between the outer circumferential surface 34 of the core structure 31 and the inner circumferential surface 17 of the stem 13 when the valve assembly 30 is received therein. Specifically, the sealing element 38 may be compressed axially and radially at a position where the sealing element 38 engages the stop projection 25 formed along the inner circumferential surface 17. The shoulder 37 may be provided to include an outer diameter smaller than the second inner diameter and greater than the third inner diameter to cause the shoulder 37 to engage the stop projection 25 at a position of maximum axial insertion of the core structure 31 into the stem 13.

The outer circumferential surface 34 further includes an outer threaded portion 39 configured for rotatable threaded connection to the second inner threaded portion 27 of the stem 13. That is, the core structure 31 is configured for axial insertion into the opening 21 and then rotation relative thereto to cause the outer threaded portion 39 to threadably engage and traverse the second inner threaded portion 27 until the axial position of the core structure 31 is established relative to the stop projection 25 of the stem 13 and a seal is established between the stem 13 and the core structure 31 at the sealing element 38.

The inner circumferential surface 35 of the core structure 31 defines a flow opening 40 for conveying the fluid (refrigerant) through the valve assembly 30 when the valve body 50 is adjusted to an open position relative to the core structure 31 where the seal structure 54 of the poppet 52 is sealingly disengaged from the valve seating surface formed by the first axial end surface 32 of the core structure 31. The flow opening 40 may be substantially cylindrical in shape and may be arranged concentrically relative to the central shaft 51 of the valve body 50. In addition to providing a fluid pathway through the core structure 31, the flow opening 40 also receives the central shaft 51 of the valve body 50 therethrough to position the poppet 52 and the cap engaging structure 53 on opposing axial ends of the core structure 31.

The core structure 31 further defines a collar 41 at the second axial end surface 33 of the core structure 31. The collar 41 includes a substantially cylindrical inner circumferential surface 42 dimensioned to slidably receive the cylindrical central shaft 51 of the valve body 50 therein to restrict the valve body 50 to move exclusively in the axial direction relative to the core structure 31 when adjusting the valve assembly 30 between the open and closed positions thereof. The collar 41 is shown in the present embodiment as being formed as an axially extending through-hole of a laterally extending bridge portion of the core structure 31 extending between diametrically opposing sides of the flow opening 40 towards the second axial end 33 of the core structure 31. However, alternative configurations of the opening 40 and the collar 41 may be utilized for axially guiding the central shaft 51 of the valve body 50 while remaining within the scope of the present invention, so long as a fluid flow path is maintained through the core structure 31 in the manner described herein.

The cap engaging structure 53 includes an axially outwardly facing cap engaging surface 55 and an oppositely arranged and axially inwardly facing spring engaging surface 56. The cap engaging structure 53 is shown as including an axially symmetric semi-hemispherical shape, thereby resulting in the cap engaging surface 55 having a circular cross-sectional shape that is tapered to expand radially outwardly from a point disposed along the central axis of the central shaft 51 at a distal end of the cap engaging structure 53 to a circular edge where the cap engaging surface 55 meets the spring engaging surface 56 about the perimeters thereof. However, alternative axially symmetric shapes having a tapered circular cross-section may be utilized in forming the cap engaging surface 55, including the use of a conical or frustoconical surface, as desired. The spring engaging surface 56 is annular in shape and extends transversely relative to the central axis of the central shaft 51.

The spring element 60 of the illustrated embodiment is a helical spring extending axially from a first end 61 to a second end 62 thereof with the helical spring wound around an outer circumferential surface of the central shaft 51 of the valve body 50. The first end 61 engages the core structure 31 as formed along the collar 41 thereof and the second end 62 engages the spring engaging surface 56 with the spring element 60 in a normally compressed state thereof, thereby causing the spring element 60 to press against the cap engaging surface 55 in a direction normally urging the valve body 50 towards the closed position thereof where the seal structure 54 of the poppet 52 sealingly engages the valve seating surface formed by the first axial end surface 32 of the core structure 31. The spring element 60 is further configured to require additional axial compression thereof for reducing an axial spacing between the collar 41 and the cap engaging structure 53 when adjusting the valve assembly 30 from the closed position to the open position.

It should be readily apparent to one skilled in the art that the charge port 12 as shown and described herein may be provided to include the valve assembly 30 thereof integrated directly into the structure of the corresponding stem 13 while remaining within the scope of the present invention. That is, the valve assembly 30 need not be provided as a removable component of the charge port 12 to result in the desired interaction between the charge port 12 and the sensor cap 10 as described hereinafter. It should also be apparent to one skilled in the art that the configuration of the valve assembly 30 as shown and described may include various modifications while similarly maintaining the same method of operation thereof as it relates to the interactions with the disclosed sensor cap 10, so long as movement of the valve body 50 in a direction away from the distal axial end 19 of the stem 13 and further into the opening 21, while against the urging of the spring element 60, results in the disengagement of valve body 50 from a corresponding valve seating surface for adjusting the valve assembly 30 from the closed position to the open position thereof. Another example of a similar charge port configuration that may be suitable for use with the sensor cap 10 of the present invention is shown and described in U.S. Pat. No. 6,266,971, hereby incorporated herein by reference, to further supplement the description of the structure and function of the charge port 12 shown herein.

The sensor cap 10 includes a substantially cylindrical body 70 extending axially from a first axial end 71 to an opposing second axial end 72 (FIG. 3). The body 70 may be formed from substantially any rigid material, including a plastic material or a metallic material, as desired. The first axial end 71 forms a leading end of the body 70 configured for axial insertion into the opening 21 and/or around the piloting feature 20 at the distal axial end 19 of the stem 13 while the second axial end 72 is disposed axially outwardly of the opening 21. The first axial end 71 of the body 70 includes a central axial projection 73 and a surrounding sleeve 74 that each project axially away from a base surface 75 connecting the central axial projection 73 and the sleeve 74 in the radial direction of the body 70. The central axial projection 73 includes an outer circumferential surface 76 having an outer diameter that is slightly less than the first inner diameter of the first cylindrical segment 23 and slightly greater than the second inner diameter of the second cylindrical segment 24, thereby allowing for axial insertion of the central axial projection 73 until an axial end surface 77 thereof encounters a shoulder at a transition from the first cylindrical segment 23 to the second cylindrical segment 24. The outer circumferential surface 76 further includes an outer threaded portion 78 configured for rotatable threaded connection to the first inner threaded portion 26 of the stem 13. That is, the central axial projection 73 is configured for axial insertion into the opening 21 and then rotation relative thereto to cause the outer threaded portion 78 to threadably engage and traverse the first inner threaded portion 26 until the axial position of the sensor cap 10 is established relative to the stem 13.

The sleeve 74 is substantially cylindrical in shape and includes an inner circumferential surface 79 radially spaced apart from and facing radially inwardly towards the outer circumferential surface 76 of the central axial projection 73. The inner circumferential surface 79 of the sleeve 74 includes an inner diameter greater than an outer diameter of the stem 13 towards the distal end 19 thereof to facilitate axial entry and the piloting feature 20 within the sleeve 74 during a coupling of the sensor cap 10 to the charge port 12. The base surface 75 is annular in shape and extends radially between the outer circumferential surface 76 of the central axial projection 73 and the inner circumferential surface 79 of the sleeve 74 at an axially innermost end of an annular channel 80 (FIG. 3) formed between the central axial projection 73 and the sleeve 74, wherein the channel 80 is defined by the cooperation of the inner circumferential surface 79, the base surface 75, and the outer circumferential surface 76. The channel 80 is shaped and dimensioned to receive the piloting feature 20 of the stem 13 therein with the distal axial end 19 of the stem 13 facing towards and (potentially) engaging the base surface 75 when the sensor cap 10 is fully received within the opening 21 and around the stem 13.

The inner circumferential surface 79 of the sleeve 74 along the channel 80 may further include a radially outwardly extending indentation or groove 81 formed therein for receiving an annular sealing element 82 therein. The annular sealing element 82 may be an O-ring with a circular cross-sectional shape and an inner diameter that is slightly less than the outer diameter of the stem 13 along the piloting feature 20 thereof to result in the annular sealing element 82 being compressed in the radial direction upon reception of the annular sealing element 82 between the piloting feature 20 and the sleeve 74. The annular sealing element 82 may accordingly provide a fluid tight seal around the stem 13 for preventing undesired flow of a fluid (refrigerant) between the central axial projection 73 and the stem 13 towards the distal axial end 19 thereof. The annular sealing element 82 may be formed from an elastomeric material (rubber), as desired.

The body 70 of the sensor cap 10 includes a fluid flow path formed therein comprising a valve receiving opening 83, a sensor chamber 84, and a flow passageway 85 connecting the sensor chamber 84 to the valve receiving opening 83. The valve receiving opening 83 is formed within the central axial projection 73 and includes a cylindrical segment 86 and a conical segment 87 extending axially away from the cylindrical segment 86. The cylindrical segment 86 extends axially inwardly from the axial end surface 77 of the central axial projection 73 and the conical segment 87 tapers radially inwardly as the conical segment 87 extends axially away from the cylindrical segment 86 and towards the flow passageway 85. An inner circumferential surface 88 of the valve receiving opening 83 has an inner diameter along the cylindrical segment 86 thereof that is greater than that of the central shaft 51 of the valve body 50 to allow for a flow of a fluid (refrigerant) between the outer circumferential surface of the central shaft 51 and the inner circumferential surface 88. The flow passageway 85 extends axially from an end of the conical segment 87 having a minimized inner diameter following the inward tapering thereof towards the second axial end 72 of the body 70. The flow passageway 85 is cylindrical in shape and extends axially from the valve receiving opening 83 in the direction towards the second axial end 72 of the body 70 before intersecting and opening into the sensor chamber 84. An inner diameter of the flow passageway 85 is less than a maximum outer diameter of the cap engaging structure 53 of the valve body 50 to prevent axial insertion of the valve body 50 through the flow passageway 85. Instead, the cap engaging surface 55 of the cap engaging structure 53 is positioned to engage the inner circumferential surface 88 of the valve receiving opening 83 along the conical segment 87 thereof upon the sensor cap 10 being axially inserted into the opening 21 (via threading of the sensor cap 10 relative to the charge port 12) a sufficient axial distance.

The sensor chamber 84 of the disclosed embodiment is substantially cylindrical in shape and enlarged radially in comparison to the flow passageway 85, but the sensor chamber 84 may include any shape for communicating a fluid (refrigerant) therethrough while remaining within the scope of the present invention. The sensor chamber 84 forms an open space within the body 70 where the corresponding fluid (refrigerant) may be exposed to one or more sensing devices 89 of the sensor cap 10 configured to measure one of the physical properties of the fluid therein.

The sensor cap 10 and the valve assembly 30 of the charge port 12 are configured to always provide fluid communication between the flow space 28 formed within the stem 13 at an axial position beyond the valve assembly 30 and the sensor chamber 84 when the sensor cap 10 is fully threadably inserted into the charge port 12. That is, the assembly of the sensor cap 10 and the charge port 12 includes a structural feature wherein an adjustment of the valve body 50 from the normally closed position to the open position, against the urging of the spring element 60, always results in the formation of a fluid pathway between the sensor chamber 84 and the flow space 28 comprising the flow passageway 85, the valve receiving opening 83, a length of the second cylindrical segment 24 of the opening 21 extending between the sensor cap 10 and the core structure 31, the flow opening 40 through the core structure 31, and an annular space formed between the poppet 52 and the first axial end surface 32 when the poppet 52 is disengaged therefrom with the valve assembly 30 in the open position. This continuously open flow pathway may be provided via a plurality of different relationships present between the valve body 50 and the inner circumferential surface 88 of the body 70 along the valve receiving opening 83 while remaining within the scope of the present invention.

FIGS. 2 and 3 illustrate a first configuration for establishing the described flow pathway wherein a central axis of the valve body 50 (passing through a center of each of the central shaft 51 and the cap engaging structure 53) is aligned (coincides with) with a central axis of the flow passageway 85 whereas a central axis of the valve receiving opening 83 (including a central axis of each of the cylindrical segment 86 and the conical segment 87) is offset from the central axes of the valve body 50 and the flow passageway 85 in a direction perpendicular to the axial directions thereof, which may represent an offset in a radial direction of either of the valve body 50 or the flow passageway 85. The perspective of FIGS. 2 and 3 includes the central axis of the valve receiving opening 83 being offset vertically upwardly relative to the central axes of the valve body 50 and the flow passageway 85 to result in the formation of a flow path between the cap engaging surface 55 of the valve body 50 and the inner circumferential surface 88 along the conical segment 87 of the valve receiving opening 83. The cap engaging surface 55 and the conical segment 87 of the inner circumferential surface 88 each having circular cross-sectional shapes (when viewed axially) in conjunction with the radial offsetting of the central axes thereof results in the formation of a substantially crescent-shaped opening therebetween. The offsetting of the central axes, as described, also results in the ability for the cap engaging structure 53 to be axially advanced into and to engage the inner circumferential surface 88 along the valve receiving opening 83 in a manner applying an axial force to the cap engaging surface 55, against the urging of the spring element 60, while preventing a plugging of the flow pathway as a result of the circular and tapered cross-sectional shapes of the cap engaging structure 53 and the inner circumferential surface 88 eventually matching during insertion of the cap engaging structure 53 into the conical segment 87.

FIG. 4 illustrates a second configuration of the sensor cap 10 that is otherwise identical to that shown and described with respect to FIGS. 2 and 3, except an alternative form of radial offset is present at the interaction between the valve body 50, the valve receiving opening 83, and the flow passageway 85. In FIG. 4, the valve body 50 and the valve receiving opening 83 are axially aligned with one another (concentrically arranged) while a central axis of the flow passageway 85 is offset from the central axes of the valve body 50 and the valve receiving opening 83 in a direction perpendicular to the axial directions thereof, which may represent an offset in a radial direction of either of the valve body 50 or the valve receiving opening 83. From the perspective of FIG. 4, the offset of the flow passageway 85 is shown as occurring in the downward vertical direction. In similar fashion to the first configuration discussed above, the offset circular cross-sections of the cap engaging surface 55 and the flow passageway 85 result in the formation of a substantially crescent-shaped opening therebetween allowing a passage of a fluid therethrough.

The offsetting of one of the axes of the valve receiving opening 83 and/or the flow passageway 85 provides a beneficial configuration for efficiently manufacturing the sensor cap 10 to form the described continuously open flow path at the interaction of the sensor cap 10 with the valve body 50 because each of the valve receiving opening 83 and the flow passageway 85 may be formed as a bore formed through the body 70 for connecting an outer surface of the body 70 to the interior disposed sensor chamber 84. The corresponding manufacturing process accordingly requires only that the body 70 be positioned properly before each boring process is applied thereto to result in the necessary configuration for forming the continuous flow pathway without requiring any additional modifications, cuts, or deformations. The charge port 12, and especially the configuration of the valve body 50 thereof, also does not need any form of modification thereto, as the bores can be formed through the body 70 to accommodate the structure of essentially any known valve assembly 30 having the general configuration disclosed herein.

The offsets shown in the drawings may be exaggerated to more clearly illustrate the concept of forming the continuous flow path in the manner described. In practice, favorable results have been found using an offset (radially) of between 0.001 mm and 0.20 mm between the corresponding central axes that are intentionally offset with respect to either of the disclosed configurations. Especially favorable results have been found using an offset of approximately 0.1 mm with respect to either disclosed configuration. It is understood that other offset distances can be used as desired.

It should be readily apparent that additional modifications to the shape of the sensor cap 10 may be utilized in providing the relationships contemplated hereinabove while remaining within the scope of the present invention. For example, an open space may be formed or machined to one side of the intersection of the valve receiving opening 83 and the flow passageway 85 such that a fluid may always flow therebetween, even where the valve receiving opening 83, the flow passageway 85, and the valve body 50 share common central axes such that the valve body 50 nests within the valve receiving opening 83 and the flow passageway 85 in a manner that would otherwise plug the flow pathway therethrough.

The body 70 of the sensor cap 10 further includes an electronic housing portion 95 (FIG. 3) for sensor electronics associated with the corresponding sensor device(s) 89 for sensing pressure, temperature, pressure and temperature, flow rate, quality, intermolecular chromatography, and any other physical characteristics of a fluid within the system that may be monitored. Electrical wiring, contacts, and connections are also provided in the electronic housing portion 95 to effect proper transmittal of a sensor signal to a desired instrument or other readout device, as desired.

The charge port 12 and sensor cap 10 assembly operates as follows, wherein it is assumed that the charge port 12 is already assembled to the configuration thereof shown in FIG. 2 where the core structure 31 is already positioned axially within the stem 13. Additionally, it is also assumed that the valve assembly 30 is urged to the normally closed position thereof (an example of which is shown in FIG. 3 when the valve assembly 30 is not engaging the sensor cap 10 prior to assembly of the charge port 12) preceding the removable coupling of the sensor cap 10 to the charge port 12. The sensor cap 10 is axially aligned with the stem 13 of the charge port 12 and the sensor cap 10 is translated axially with the piloting feature 20 of the stem 13 received within the channel 80 formed between the central axial projection 73 and the surrounding sleeve 74. Eventually the outer threaded portion 78 of the central axial projection 73 will encounter the first inner threaded portion 26 of the opening 21 such that rotational threading of the sensor cap 10 relative to the stem 13 is required to continue to advance the sensor cap 10 axially relative to the charge port 12.

The valve body 50 of the valve assembly 30 and the central axial projection 73 of the sensor cap 10 are positioned and dimensioned relative to one another during axial insertion of the sensor cap 10 to cause the inner circumferential surface 88 of the body 70 defining the valve receiving opening 83 along the conical segment 87 thereof to eventually engage the cap engaging surface 55 of the cap engaging structure 53. Continued threading and axial movement of the sensor cap 10 relative to the charge port 12 subsequently causes the inner circumferential surface 88 to force the cap engaging structure 53 to move axially towards the collar 41 to further compress the spring element 60, which concurrently causes the poppet 52 and corresponding sealing structure 54 at the opposing end of the central shaft 51 to disengage from the valve seat formed by the first axial end surface 32 of the core structure 31, thereby adjusting the valve assembly 30 to the open position thereof. The described axial movement of the sensor cap 10 relative to the stem 13 also results in the annular sealing element 82 being compressed radially between the sleeve 74 and the piloting feature 20 of the stem 13 to seal off a potential point of leakage between the sensor cap 10 and the charge port 12 following the coupling therebetween.

The disclosed coupling of the sensor cap 10 to the charge port 12 results in the valve assembly 30 remaining in the open position while the configuration of the cap engaging structure 53 relative to the inner circumferential surface 88 of the valve receiving opening 83 maintains a continuously open flow path around the valve body 50. The coupling of the sensor cap 10 to the charge port 12 accordingly results in an open fluid pathway between the flow space 28 fluidly coupled to the associated fluid system and the sensor chamber 84 having the sensor device(s) 89 therein for detecting and measuring any desired characteristics or properties of the fluid communicated by way of the flow space 28.

The sensor cap 10 may be removed from the charge port 12 via opposing rotational movement for threadably decoupling the sensor cap 10 therefrom. The axial removal of the sensor cap 10 results in the spacing between the cap engaging structure 53 and the collar 41 continuing to increase until the poppet 52 and sealing structure 54 thereof once again engage the valve seat formed by the first axial end surface 32. The valve assembly 30 is thus returned to the normally closed configuration thereof to prevent undesired flow from the flow space 28 past the valve assembly 30 following removal of the sensor cap 10 and disengagement of the annular sealing element 82 from the stem 13. The valve assembly 30 is thus in a configuration for receiving a suitable charging mechanism having structure suitable for opening the valve assembly 30 and communicating a fluid to the flow space 28 via axial insertion of the charging mechanism in a manner similar to the that described herein.

Figure 5:
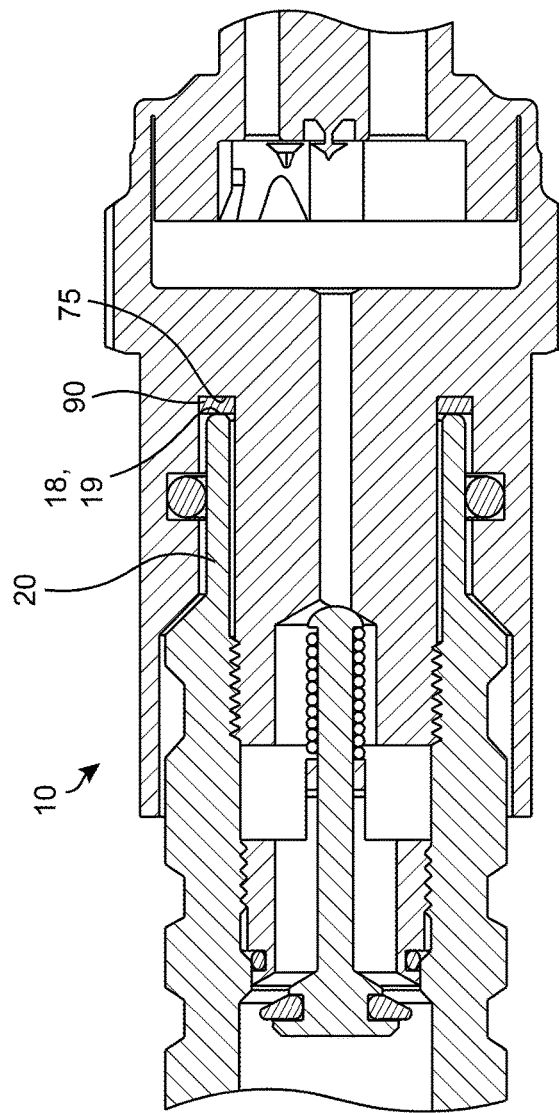
FIG. 5 is a fragmentary elevational cross-sectional view of the charge port and a sensor cap assembly of FIG. 2 with an axially compressed sealing element disposed therebetween according to another embodiment of the present invention.

Referring now to FIG. 5, an alternative sealing configuration is disclosed between the charge port 12 and the sensor cap 10 wherein an additional annular sealing element 90 is disposed axially between the axial end surface 18 of the stem 13 formed at the distal axial end 19 thereof and the base surface 75 formed along a base of the channel 80 formed between the central axial projection 73 and the surrounding sleeve 74. The annular sealing element 90 is shown as having a substantially rectangular cross-sectional shape, but alternative shapes may be utilized without necessarily departing from the scope of the present invention. The annular sealing element 90 may be formed from an elastomeric material (rubber) that is resiliently deformable in reaction to axial compression between the facing surfaces 18, 75 when the sensor cap 10 is fully axially received relative to the stem 13 of the charge port 12. The annular sealing element 90 may be used in addition to the annular sealing element 82, as shown in FIG. 5, or may be used in place of the annular sealing element 82, as desired.

Figure 6:
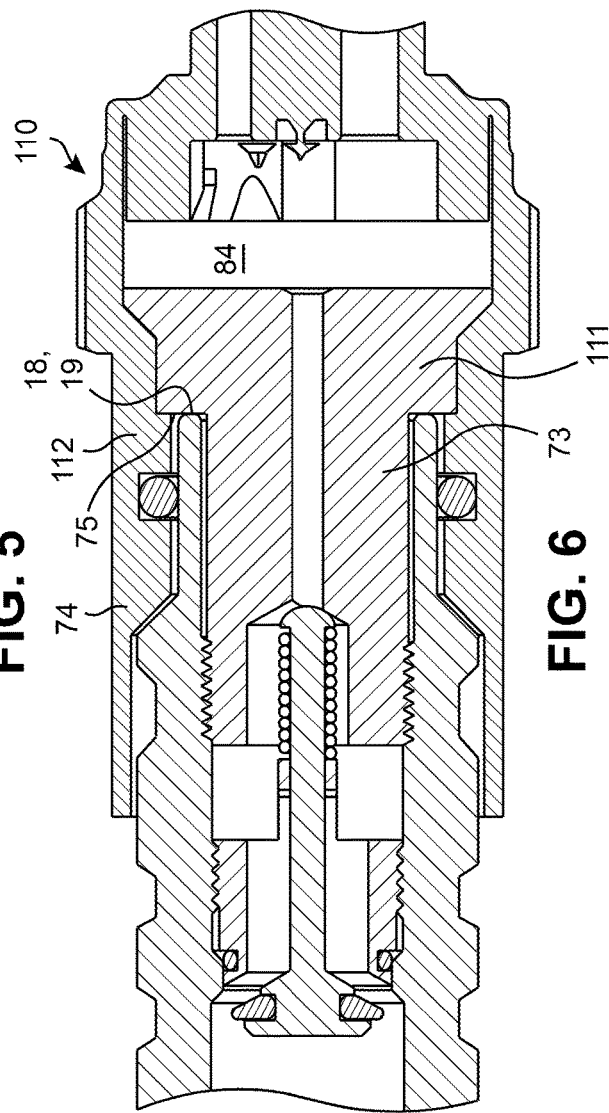
FIG. 6 is a fragmentary elevational cross-sectional view of a charge port and a sensor cap assembly according to another embodiment of the present invention, wherein the sensor cap includes a metallic inner body and an overmolded outer body.

FIG. 6 illustrates a sensor cap 110 suitable for removable coupling to the charge port 12 according to another embodiment of the present invention. The sensor cap 110 is substantially identical in form to the sensor cap 10 except for a division of the sensor cap 110 into an inner body 111 and an outer body 112 with the sensor chamber 84 formed as an axially extending opening present therebetween. The inner body 111 includes the central axial projection 73 (including all flow openings formed therethrough) and the base surface 75 extending radially outwardly therefrom, whereas the outer body 112 includes the sleeve 74 and the portions of the sensor cap 110 enclosing the sensing device(s) 89 thereof.

The division of the sensor cap 110 into the inner body 111 and the outer body 112 facilitates an ability to utilize metal sealing technology at the interface between the axial end surface 18 of the charge port 12 and the base surface 75 of the inner body 111. The inner body 111 may be provided as an insert formed from a metallic material while the outer body 112 may be provided as a polymeric (plastic) overmold of the metallic inner body 111. Alternatively, the inner body 111 may be received within a complimentary opening of the outer body 112, as desired. The inner body 111 may be formed from a brass alloy such as C11000, any blend with antimony or tin, and/or other blends (e.g.: "Babbit"). It is understood that other metals, such as aluminum, for example, can be used in forming the inner body 111, as desired.

The metallic formation of the inner body 111 may facilitate a variety of different sealing configurations between the axial end surface 18 of the stem 13 and the base surface 75 of the inner body 111, all of which include axial insertion of the sensor cap 110 relative to the charge port 12 such that the facing surfaces 18, 75 directly engage one another and/or an intervening sealing element when the sensor cap 110 is suitable removably coupled to the charge port 12 for forming the continuously open flow path to the sensor chamber 84. In some embodiments, the piloting feature 20 of the stem 13 is formed from a metallic material and an annular seal is formed where the axial end surface 18 directly engages the base surface 75 via deformation of one of the facing surfaces 18, 75. In other embodiments, the base surface 75 is formed from one of the described metallic materials and further includes the addition of a metallic plate 120 thereon, as shown in FIG. 7. For example, the base surface 75 may be provided with a tin plate thereon and may have a tin thickness between 0.005 mm and 0.50 mm to effect sealing of the tin plate against the axial end surface 18 via deformation of the tin plate. It is understood that other plating metals, such as aluminum, for example, can be used, as desired. In yet other embodiments, an independently provided metallic sealing element 130 (an example of which is shown in FIG. 12) may be disposed between the facing surfaces 18, 75 for compression and deformation therebetween, wherein the metallic sealing element 130 may have the general configuration of the annular sealing element 90 shown in FIG. 5.

As shown throughout FIGS. 8-11, the base surface 75 may further be provided with an axial sealing projection 125 extending therefrom for further facilitating sealing contact between the base surface 75 and the axial end surface 18 of the stem 13 according to each of the sealing configurations described above. Specifically, each of the axial sealing projections 125 extends axially towards the axial end surface 18 in a manner causing an annular engagement area to form between an axially distal surface of each axial sealing projection 125 and one of the axial end surface 18, an intervening metallic sealing element 130 disposed between the base surface 75 and the axial end surface 18, and/or a metallic plate 120 layer formed on the base surface 75 and inclusive of the axial sealing projection 125 thereof (not shown in the figures), depending on which of the above-described configurations is utilized. The different disclosed configurations of the axial sealing projection 125 include a triangular shape (FIG. 8), a rounded arcuate or semi-circular shape (FIG. 9), an inclined or tapered surface (FIG. 10), and a three-sided polygonal shape (FIG. 11). It should be understood that alternative shapes and configurations of the axial sealing projections 125 may be utilized while remaining within the scope of the present invention.

Figure 12:
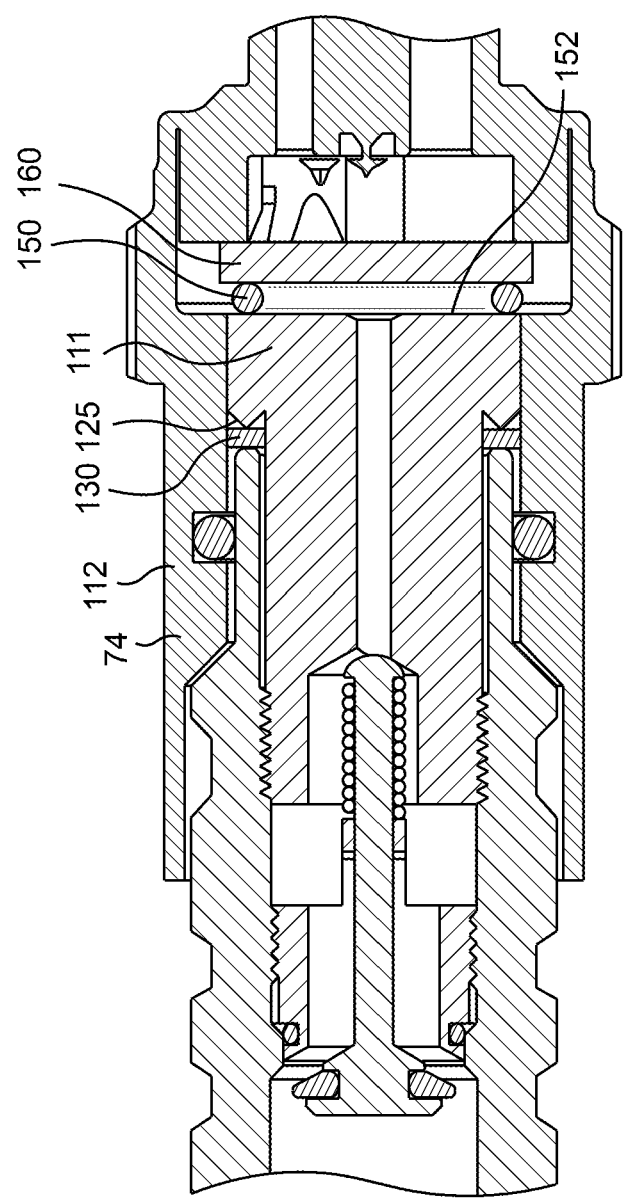
FIG. 12 is a fragmentary elevational cross-sectional view of a charge port and a sensor cap assembly according to another embodiment of the present invention, wherein the sensor cap includes an inner body sealed against a pressure plate of the outer body.

Referring now to FIG. 12, a configuration of the inner body 111 relative to the outer body 112 is shown that further includes an annular sealing element 150, such as an elastomeric O-ring, disposed between an axial end surface 152 of the inner body 111 and a pressure plate 160 associated with the sensor device(s) 89 of the sensor cap 110, wherein the annular sealing element 150 is compressed axially therebetween to further seal a joint between the inner body 111 and the outer body 112. The configuration shown in FIG. 12 may allow for the use of an independently provided inner body 111 utilized as an insert into the outer body 112 during assembly of the sensor cap 110. FIG. 12 also illustrates an example of one of the axial sealing projections 125 contacting a face of the annular metallic sealing element 130 disposed between the base surface 75 and the axial end surface 18, as described hereinabove.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A sensor cap configured for removable coupling to a charge port including a stem defining an opening and a valve assembly disposed within the opening of the stem, the sensor cap comprising:
   a body having a flow path formed therein, the flow path including a sensor chamber having a sensing device disposed therein;
   wherein a surface of the body is configured to engage a valve body of the valve assembly during axial insertion of a first portion of the body into the opening of the stem to cause the valve body to disengage from a valve seat of the valve assembly, wherein the disengagement of the valve body from the valve seat adjusts the valve assembly from a closed position to an open position providing fluid communication between a flow space formed within the opening of the stem to a first axial side of the valve assembly and the flow path of the body disposed to an opposing second axial side of the valve assembly, wherein the sensing device disposed in the sensor chamber is fluidly coupled to the flow space by way of the flow path when the valve assembly is adjusted to the open position thereof, thereby allowing the sensing device to sense a property of a fluid originating from the flow space.

2. The sensor cap of claim 1, wherein the flow path of the body further includes a valve receiving opening formed therein and configured to receive a portion of the valve body therein during the axial insertion of the first portion of the body into the opening of the stem.

3. The sensor cap of claim 2, wherein an inner surface of the body defining the valve receiving opening thereof forms the surface of the body configured to engage the valve body during the axial insertion of the first portion of the body into the opening of the stem.

4. The sensor cap of claim 3, wherein a flow pathway is formed between the valve body and a portion of the inner surface of the body not directly engaging the valve body.

5. The sensor cap of claim 4, wherein the flow pathway is formed by offsetting a central axis of symmetry of the inner surface of the body from a central axis of symmetry of the valve body.

6. The sensor cap of claim 5, wherein the valve receiving opening is conical in shape where the inner surface of the body engages the valve body.

7. The sensor cap of claim 5, wherein an offset present between the central axis of symmetry of the inner surface of the body and the central axis of symmetry of the valve body is between 0.001 mm and 2.0 mm.

8. The sensor cap of claim 5, wherein each of the inner surface of the body and the valve body include circular cross-sectional shapes where the valve body engages the inner surface of the body to cause the flow pathway to have a crescent shape.

9. The sensor cap of claim 4, wherein the flow path of the body further includes a flow passageway extending between and fluidly coupling the valve receiving opening to the sensor chamber.

10. The sensor cap of claim 9, wherein the flow pathway is formed by offsetting a central axis of symmetry of the flow passageway from a central axis of symmetry of the valve body.

11. The sensor cap of claim 10, wherein an offset present between the central axis of symmetry of the flow passageway and the central axis of symmetry of the valve body is between 0.001 mm and 2.0 mm.

12. The sensor cap of claim 1, wherein the axial insertion of the first portion of the body into the opening of the stem includes a threaded portion of the body engaging a threaded portion of the stem.

13. The sensor cap of claim 1, wherein the first portion of the body is a central axial projection of the body, wherein an annular channel is formed in the body between the central axial projection and a surrounding annular sleeve of the body, and wherein the channel is configured to receive a distal axial end of the stem therein when the central axial projection is axially inserted into the opening of the stem.

14. The sensor cap of claim 13, wherein an annular sealing element is radially compressed between an inner circumferential surface of the sleeve and an outer circumferential surface of the stem when the distal axial end of the stem is received within the channel.

15. The sensor cap of claim 13, wherein an annular sealing element is axially compressed between a radially extending base surface of the body formed along the channel and the distal axial end of the stem.

16. The sensor cap of claim 15, wherein the annular sealing element is one of metallic or elastomeric.

17. The sensor cap of claim 13, wherein a radially extending base surface of the channel includes metallic plating disposed thereon, wherein the metallic plating disposed on the base surface is axially compressed between the distal axial end of the stem and the base surface.

18. The sensor cap of claim 13, wherein a radially extending base surface of the channel includes an axial projection projecting therefrom in a direction towards the distal axial end of the stem.

19. The sensor cap of claim 13, wherein the body is divided into a metallic inner body comprising the central axial projection and a radially extending base surface of the channel and a plastic outer body comprising the sleeve.

20. The sensor cap of claim 19, wherein the outer body is overmolded onto the inner body.

* * * * *